US007184752B2

(12) United States Patent
Chen et al.

(10) Patent No.: US 7,184,752 B2
(45) Date of Patent: Feb. 27, 2007

(54) WIRELESS IDENTIFICATION SECURITY ACTIVATION DEVICE

(75) Inventors: Chia-Cheng Chen, Taipei (TW); Yi-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 38 days.

(21) Appl. No.: 11/161,133

(22) Filed: Jul. 25, 2005

(65) Prior Publication Data

US 2006/0111096 A1 May 25, 2006

(30) Foreign Application Priority Data

Nov. 24, 2004 (TW) ............................. 93136071 A

(51) Int. Cl.
*H04M 1/66* (2006.01)

(52) U.S. Cl. ...................... 455/411; 455/410; 455/420; 455/419; 713/323; 713/193; 380/247

(58) Field of Classification Search ................ 455/411, 455/410, 420, 419; 713/323, 193; 380/247
See application file for complete search history.

(56) References Cited

U.S. PATENT DOCUMENTS

2002/0099949 A1* 7/2002 Fries et al. ................ 713/200
2003/0005316 A1* 1/2003 Girard ........................ 713/193
2003/0125074 A1* 7/2003 Tanada et al. .............. 455/552
2004/0177265 A1* 9/2004 Ice et al. .................... 713/200
2005/0037734 A1* 2/2005 Tanaka et al. .............. 455/411
2005/0054342 A1* 3/2005 Otsuka .................... 455/426.2
2005/0228980 A1* 10/2005 Brokish et al. ................ 713/2
2006/0128305 A1* 6/2006 Delalat ...................... 455/41.2

* cited by examiner

*Primary Examiner*—Danh Cong Le
(74) *Attorney, Agent, or Firm*—Jiang Chyun IP Office

(57) ABSTRACT

A security activation method for wireless identification for controlling an electronic device system boot up includes the following steps: receiving a first identification signal, designating a corresponding first identification code as a pre-established account, transmitting a confirmation signal to a wireless transmission device corresponding to the pre-established account, receiving an authorization signal from the device, receiving a second identification signal, and comparing a corresponding second identification code with the pre-established account; if the second identification signal is the same as the pre-established account, determine whether the system accesses a boot buffer inside the electronic device; and having the following corresponding implemented actions: if the system accesses the boot buffer inside the electronic device, the system boots and transitions into operational mode; and if the system doesn't access the boot buffer, the system is shut down and receives an automatic command for system boot.

17 Claims, 3 Drawing Sheets

WIRELESS IDENTIFICATION SECURITY ACTIVATION DEVICE

CROSS-REFERENCE TO RELATED APPLICATION

This application claims the priority benefit of Taiwan application serial no. 93136071, filed on Nov. 24, 2004. All disclosure of the Taiwan application is incorporated herein by reference.

BACKGROUND OF THE INVENTION

1. Field of the Invention

The present invention is related to security activation device. In particularly, it relates to a type of wireless identification security activation method.

2. Description of the Related Art

Today, computer already is a very popular type of hardware. Almost all of personal and professional information are processed using a computer for handling file set up and retrieval related activities. In addition, computer is also frequently targeted for theft and becomes a source for information leakage.

Typically people often neglect leaving their computer unattended to, thus becomes subjected to serious security risk and other hidden perils, when an user becomes distracted by unrelated activities; an unattended computer system that remains running is described as an open target for attack, often unwittingly leaking secrets and information without any awareness of such intrusion has taken place. Currently on the market today, there is a type of Wireless PC Lock, which is used as a method for securing computer hardware assets. Whenever a user leaves his computer system temporarily unattended, and thus creating a brief period of system vulnerability, one only needs to respond by activating the wireless security software program, for which the wireless identification lock system comes on standby mode. At this time by taking the computer system outside the protective detection range of the wireless transmitter for the Wireless PC Lock, the computer system immediately enters into secure mode, and thus preventing others from any use of the PC. It has user-friendly functions, and can be used to prevent information leakage. Referring to FIG. 1, its functional architecture comprising the following: a set of wireless transmitter 11 and wireless receiver 12 (wireless receiver 12 is installed with the USB connector socket of the computer system; transmitter 11 is carried on the person of PC user). Whenever the user is using the computer system, the wireless transmitter 11 sends out an intermittent signal back to the wireless receiver 12, the wireless receiver 12 notifies the computer system's application system 131 that the user is in the effective operating range of the security system, the computer system 13 then conducts the usual mode. However, as soon as the user is at least two to three meters away from the protected computer system 13, receiver 12, upon immediately detecting no response signal, sends a message to the compute application system 131. As a result, the computer application system 131 notifies the computer system 13 to automatically enter into a lock-down mode. Once in lock-down mode, whenever the user returns to within the two to three meters detection range, the computer system 13 then automatically disengages the lock-down mode.

Whenever the receiver 12 receives a signal from the transmitter 11, the receiver 12 transmits a processed signal back to the computer system 13 to allow the application system 131 to commence operations. But because the computer system 13 ON and OFF functions are controlled by a Basic Input Output System (BIOS) 132, the application system 131, during boot up of the computer system 13, can then receive the signal sent out from the receiver 12. Therefore, some of conventional technology's drawbacks are that an additional hardware peripheral is needed, and also cannot provide the automatic boot function whenever the computer system 13 is shut down.

Therefore, this invention is not only using different method from conventional technology in the field, but also an improved technology. Furthermore, this invention provides several embodiments for implementation; and it offers more practical and diversified capabilities than conventional technology.

SUMMARY OF THE INVENTION

The objective of this invention is to combine use of an embedded controller (EC) associating with characteristics of portable device (such as notebook computer, PDA, and mobile phone), and common wireless transmission technologies. Then, a software and hardware protection on the portable device can be integrated, wherein the mobile phone or equipment (such as Bluetooth, UWB, ZigBee, and others) as the wireless device can be used to have power control of the portable device with the same function of wireless transmission. In addition, the EC is also used for user authentication and hardware security protection, and preventing theft of data from mobile devices. While the equipment is running, it can be used to confirm user identity and to provide optimal protection of the integrated hardware and software system.

To accomplish the aforementioned objective, an embodiment of the invention provides a method of wireless identification security activation, for use to control a boot an electronic apparatus. Such method includes the following steps. A first identification signal is received, and an identification code corresponding to the first identification signal is designated to be a pre-established account. A confirmation signal is issued to a corresponding wireless transmission device of the pre-established account. An acknowledgement return signal that is sent from the wireless transmission device is received. A second identification signal is received, the second identification signal is compared with the second identification code. If the second identification code and the pre-established account is found to be identical, it is determined if a boot flag, accessed by the system, is stored within the electronic device, and the following corresponding actions is executed: if it is YES, the system is turned on, and enters into an operational mode; if it is NO, the system is turned off, upon receiving of an automatic boot command, the system is activated; the lag time between the unacknowledged second identification signal and the first identification signal is recorded; it is determined if the lag time is larger than a preset time value. If it is YES, a secure mode is entered; the lag time between the unacknowledged second identification signal and the first identification signal is recorded. It is determined if the lag time is larger than the second preset time value. If it is then the system is then shut down.

Another objective of the current invention is to provide a method of wireless identification security activation, for control on a boot operation of an electronic system. The method includes the following steps. A plurality of identification signals is received, where each identification signal has a corresponding identification code. From the accounts corresponding to the received identification signals, one of the accounts is set to be a pre-established account. A confirmation signal is issued to a wireless transmission device corresponding to the pre-established account. The acknowledging signal sent from the wireless transmission device is received. It is determined if the system has stored a boot flag accessed by the system, and the following corresponding actions is executed. If it is YES, the system is activated and enters an operational mode. If it is NO, the system is shut down and an automatic boot command is received to activate the system.

According to above aspect, the electronic device comprises of a computer.

According to above aspect, the wireless transmission device comprises a mobile phone.

According to the above aspect, the electronic device and wireless transmission device can use Bluetooth to achieve the wireless signal transmission.

According to the above aspect, the electronic device and the wireless transmission device can use Ultra Wide Band (UWB) to achieve the wireless signal transmission.

In comparing with the conventional technology, the invention comprises the following advantages: providing a security activation method using wireless identification; protecting the system hardware from unlawful tampering; and providing automatic system boot functionality. Whereas, the conventional technology requires the added burden of incorporating additional hardware installations to have a comparable level of security protection, and has the drawbacks of limited protection due to operational capabilities only during normal operations. Therefore, it is evident that the invention possesses several beneficial merits.

BRIEF DESCRIPTION OF THE DRAWINGS

The accompanying drawings, which are incorporated herein and form a part of the specification, illustrate the present invention, and together with the description, further serve to explain the principles of the invention and to enable a person skilled in the pertinent art to make and use the invention.

DESCRIPTION OF THE EMBODIMENTS

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

Figure 1:
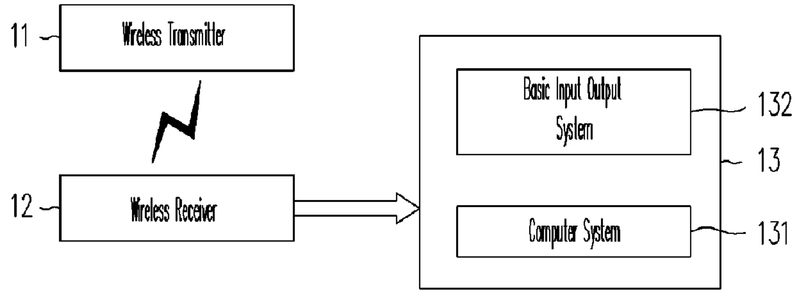
FIG. 1 (PRIOR ART)
FIG. 1 is a block diagram, schematically illustrating a conventional device.
Figure 2:
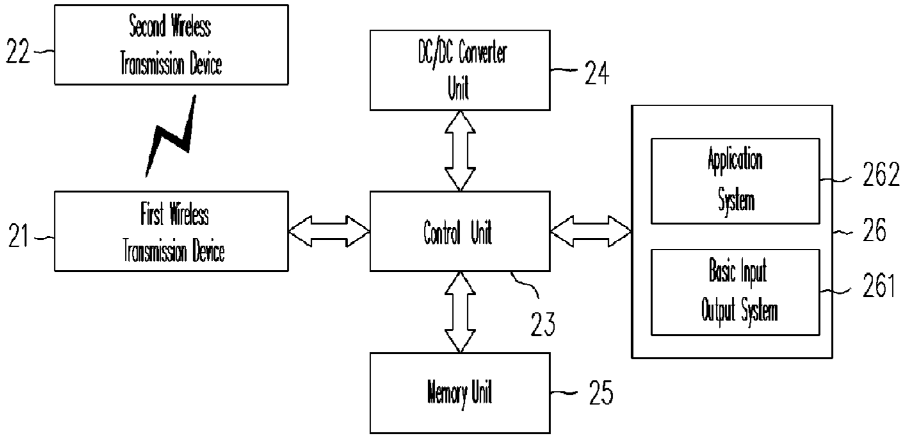
FIG. 2 is a block diagram, schematically illustrating a device according to an embodiment of the present invention.

Referring to FIG. 2, the schematic diagram of a device of an embodiment according to present invention is shown. The device comprises: a first wireless transmission device 21, a second wireless transmission device 22, a control unit 23, a DC/DC converter unit 24, a memory unit 25, a primary system 26, a BIOS 261, and an application system 262. It is noted that the control unit 23, the first wireless transmission device 21, the DC/DC converter unit 24, the memory unit 25, and the primary system 26 are connected together. The control unit 23 comprises an Embedded Controller (EC). The first wireless transmission device 21 and the second wireless transmission device 22 can both utilize Bluetooth, UWB, ZigBee, and other similar system to achieve the wireless signal transmission. An embodiment of the invention can use Bluetooth as the wireless communication protocol, for example. The aforementioned first wireless transmission device 21 and the second wireless transmission device 22 can be used in separate entities inside two portable devices, for one of the portable devices comprises of computer, personal identification card, mobile phone, and/or others. Meanwhile, the portable devices can conduct wireless communications simultaneously with a plurality of other wireless transmission devices using various other wireless communication protocols.

The control unit 23 of the present invention uses an independent power from the DC/DC converter unit 24 to separately provide the power. Furthermore, it provides power to the circuitry of the portable device. As a result, it has independent operational capabilities without booting the system. Upon receiving the signal sent from the first wireless transmission device 21, the control unit 23 can rely on the user's own personal settings to convert the signal, and thereby the DC/DC converter unit 24 with other power can be activated, so as to automatically boot the system.

Figure 3:
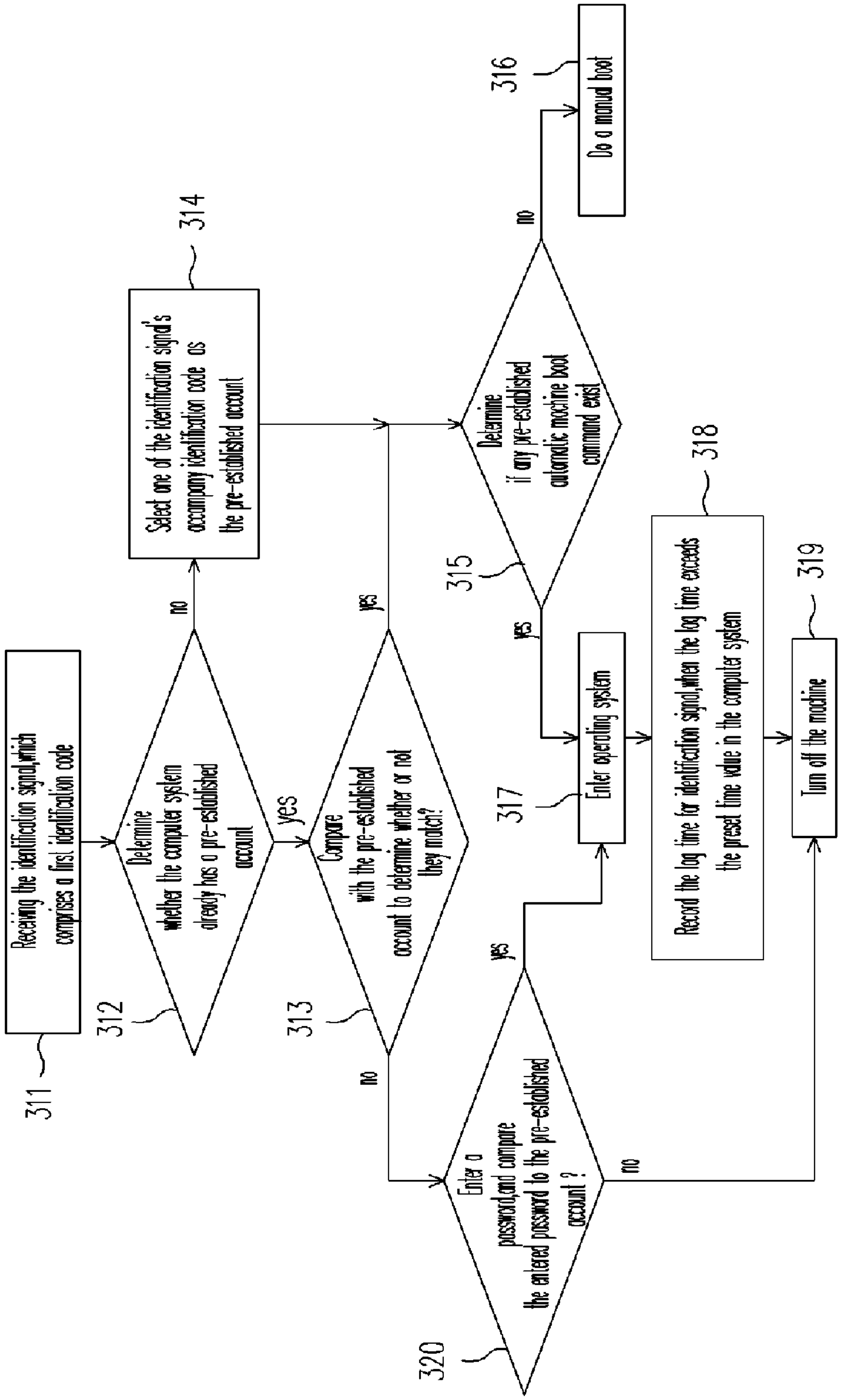
FIG. 3 is a simplified flowchart, schematically illustrating the steps according to an embodiment of the present invention.

Referring to FIG. 3, it is a simplified flowchart diagram of an embodiment according to the present invention. The accompanying steps are the following. First, the first wireless transmission device 21 searches for a specified coverage space for all of the transmitted identification signals sent from the second wireless transmission unit 22. Therefore, it is possible to receive an abundant amount of identification signals (step 311). Determine if the system already have a pre-established account (step 312). If not, select one of the identification signal's accompany identification code as the pre-established account (step 314). Determine if any pre-established automatic machine boot command existed (step 315) If not, do a manual boot (step 316). If when the first wireless signal transmission unit is able to receive the corresponding identification code and also was able to compare with the pre-established account to determine whether or not they match (step 313). Launch automatic activation and enter into operating system (step 317). Later a computer system 13 continues to receive the identification signals, and record the lag time for identification signal, when the lag time exceeds the preset time value in the computer system 13 (step 318). System enters into secure mode or turns off the machine automatically (step 319).

In addition, whenever the first wireless transmission device receives the designated identification code and upon determination of a mismatch between the identification code and the pre-established account, the system requests the user to enter a password, and compares the entered password to the pre-established account; once the two numbers are found to be identical, the system boots (step 320) and enters into operational status (step 317); on the other hand, if the two numbers are not the same, system terminates immediately (step 319).

Figure 4:
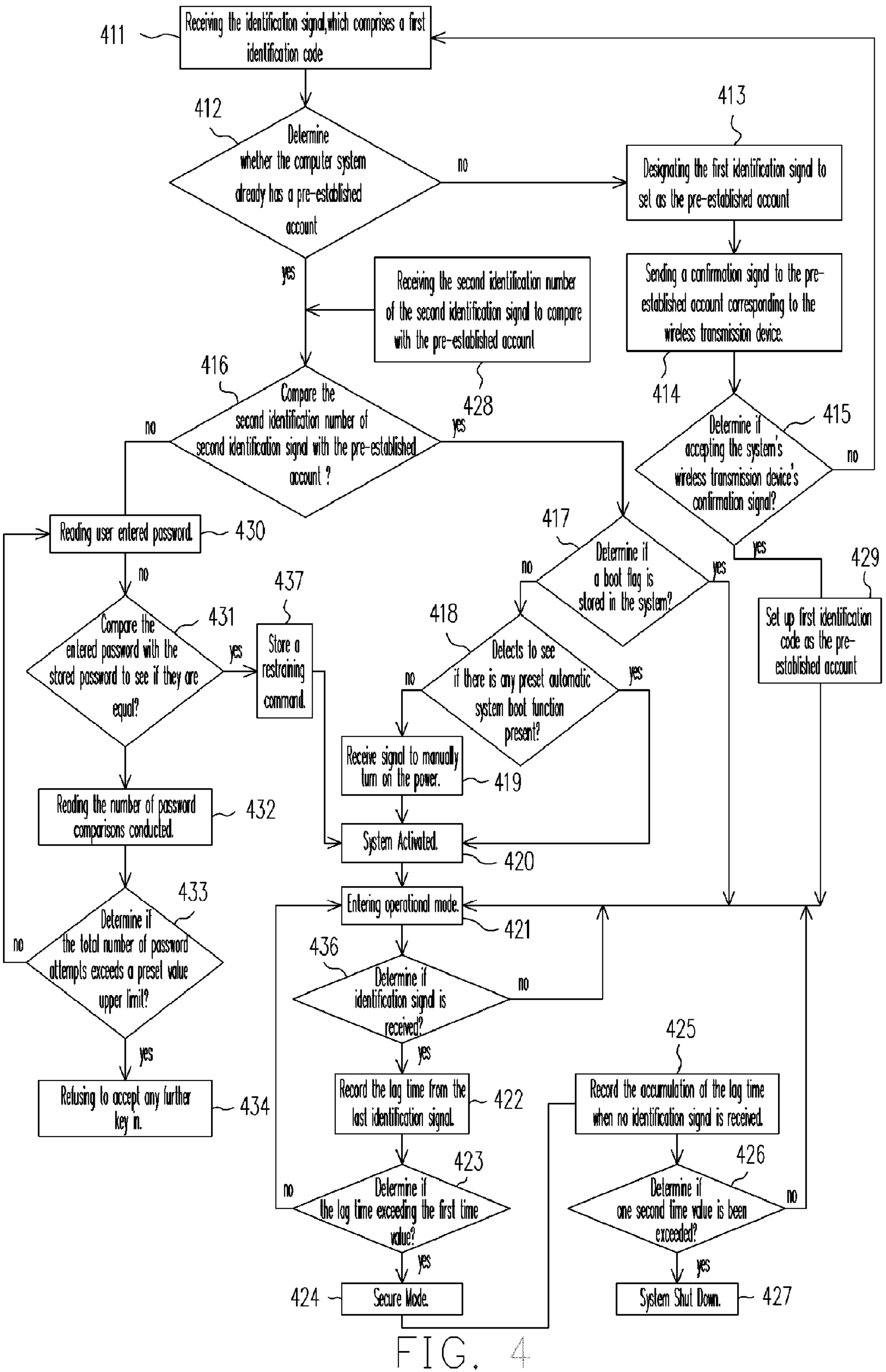
FIG. 4 is a detailed flowchart, schematically illustrating the steps according to an embodiment of the present invention.

Referring to FIG. 4, it is a simplified flowchart of an embodiment according to the present invention. The accompanying procedures are as follows.

1. Pre-established Account Set Up Procedure

Using the identification signal generated within the specified coverage space from the wireless transmission device inside the computer system 13, the computer system can simultaneously seek out many identification signals; every bona fide identification signal shall have a corresponding identification code. When the computer system receives the first identification signal, which comprises a first identification code (step 411), the receiver decides whether the computer system already have a pre-established account (step 412), if not, it takes the first identification signal to set as the pre-established account (step 413). And the confirmation signal is sent from the wireless transmission device inside the computer system to the pre-established account corresponding to the wireless transmission device (step 414). As soon as the wireless transmission device receives the confirmation signal and upon the wireless transmission device agreeing to form a communication link with the system wireless transmission device, it sends back the authorization signal or refusal signal (step 415), the system upon receiving the first identification code will set it up as the pre-established account (step 429). If the wireless transmission device does not agree to set up a communication link with the computer system, it will not send back an authorization signal. In addition, the identification signal within the search coverage space of the wireless transmission device is received by the computer system; and the first identification signal consisting of a first identification code (step 411); furthermore, upon completion of the communication link between the wireless transmission device and the computer system, when the computer system receives a second identification signal, it directly takes the second identification number of the second identification signal to compare with the pre-established account to determine whether to execute system boot (steps 428, 416).

2. Security Activation Method

When the wireless transmission device inside the computer system receives an identification signal from the user's accompanying identification card (or the wireless transmission device inside a mobile phone), the wireless transmission device inside the computer system immediately conducts the decryption processing on the identification signal and sends out a corresponding identification code to the control unit 23 (step 411). The control unit 23 takes the stored pre-established account to compare to the identification code (step 416). If the two numbers are found to be identical:

a. It redetects whether the system remains running, and determines if a boot buffer is stored in the system (step 417); if the system has been turned on, the control unit 23 via the BIOS uses the application system to directly enter operational mode (step 421).

b. If the system is turned off, it first detects to see if there is any preset automatic system boot function present (step 418); if already preset, the system is activated (step 420); on the other hand, if not already preset, the user manually turns on the power for the switch (step 419). When the computer system receives the activation signal, it is then activated (step 420).

c. After the system enters operational mode (step 421), the wireless transmission device is to detect whether if any identification signal is received (step 435), and records the lag time from the last identification signal (step 422); when the system record receives no new lag times after exceeding the first time value (step 423), the system enters secure mode (step 424)(available modes are the following: power-saving mode, standby mode, hibernation mode, power-down mode, and encryption mode; later the system continues to record the accumulation of the lag time when no identification signal is received; if one second time value is been exceeded (steps 425, 426), the system automatically shuts down (step 427); the second time value commences from when identification signals are no longer received following the first recorded time as recorded by the system.

If the identification code and the pre-established account were different, the system requests the user to enter in the password, the system compares the entered password with the stored password (steps 430,431); if found identical, the system becomes operational (step 420). When using this method to turn on the computer system, the system first stores a restraining command; therefore, one cannot conduct changes to the pre-established account unless pre-established account installation has been re-identified (step 436); otherwise, the system records the number of password comparisons conducted (step 432). If the total number of password attempts exceeds a preset value upper limit (step 433), it is clearly evident that an intruder may be trying to enter, the system no longer accepts the user's password (step 434).

What is claimed is:

1. A method of security activation in wireless identification, using a wireless transmission device to control a boot function of an electronic device, comprising the steps of:

a. issuing a confirmation signal from the electronic device to the wireless transmission device, wherein the electronic device comprises a first identification code, and the first identification code is a pre-established account for the electronic device;

b. receiving the confirmation signal by the wireless transmission device and issuing an authorization signal;

c. receiving the wireless signal by the electronic device;

d. receiving a second identification signal, wherein the second identification signal has a second identification code;

e. comparing the second identification code with the pre-established account to judge whether or not being matched;

f. if the second identification code is found to be matching with the pre-established account, determining whether or not the system has a boot flag:

when the system already having the boot flag, the system is at a turned-on state, and entering into an operational mode; and when the system does not have the boot flag, the system is at a shut-down state, and receiving an automatic boot command to boot the system.

2. The method according to claim 1, wherein the electronic device comprises a computer system.

3. The method of security activation according to claim 1, wherein the wireless transmission device comprises a mobile phone.

4. The method of security activation according to claim 1, wherein the electronic device and the wireless transmission device use Bluetooth for wireless communication.

5. The method of security activation according to claim 1, wherein the electronic device and the wireless transmission device use Ultra Wide Band (UWB) for wireless communications.

6. The method of security activation according to claim 1, wherein prior to the step a, further comprising the following steps:

a1. utilizing the electronic device to receive the first identification signal's first identification code transmitted from the wireless transmission device, and designating the first identification code as the electronic device's pre-established account.

7. The method of security activation according to claim 1, further comprising the steps of:
f1. recording the lag time of not receiving the second identification signal;
f2. determining whether the lag time is larger than a first time interval value; and
f3. if the lag time is larger than the first time interval value, the system entering a secure mode.

8. The method of security activation according to claim 7, further comprising the steps of:
f4. recording the lag time of not receiving the second identification signal;
f5. determining whether the lag time is larger than a second time interval value; and
f6. entering shut down mode for the system if the lag time is larger than a second time interval value.

9. The method of security activation according to claim 8, wherein the method of calculating the second time value should commence when the system no longer receiving identification signals following the first recorded time.

10. A method of security activation for wireless authentication, using a wireless transmission device to control a system boot function of an electronic device, comprising the steps of:
a. the electronic device receiving a plurality of first identification signals' first identification code numbers transmitted from a plurality of wireless transmission device, each identification signal including a corresponding identification code number;
b. the electronic device using a plurality of identification signal's corresponding account listing, pinpointing one particular set as the pre-established account;
c. the electronic device transmitting a confirmation signal to the wireless transmission device corresponding to the pre-established account;
d. the wireless transmission device receiving a confirmation signal, and sending out an authorization signal;
e. the electronic device receiving wireless signals;
f. determining whether the system contains a boot flag already:
and when the system does not contain the boot flag, system is booting and transitioning into operational mode; and also when the system does not contain the boot flag, system is shutting down, receiving an automatic boot command, and ordering the system to boot.

11. The method of security activation according to claim 10, wherein the electronic device includes a computer system.

12. The method of security activation according to claim 10, wherein the wireless transmission device includes a mobile phone.

13. The method of security activation according to claim 10, wherein the electronic device and the wireless transmission device use Bluetooth for wireless communication.

14. The method of security activation according to claim 10, wherein the electronic device and the wireless transmission device use Ultra Wide Band (UWB) for wireless communication.

15. The method of security activation according to claim 10, further comprising the steps of:
f1 recording the lag time between the unacknowledged identification signal and the prior identification signal;
f2 deciding whether the lag time is larger than a preset time value; and
f3 if the lag time is larger than the first time interval value, the system entering secure mode.

16. The method of security activation according to claim 15, further comprising the steps of:
f4 recording the lag time between the unacknowledged identification signal and the prior identification signal;
f5 determining if the lag time is larger than the second preset time value; and
f6 if the lag time is larger than a second time interval value, the system entering a shut down mode.

17. The method of security activation according to claim 16, wherein the method of calculating the second time value should commence when identification signals are no longer received following the first recorded time by the system.

* * * * *